Sept. 27, 1932.  F. CLANCY  1,879,091
AUTOMATIC AIR VALVE FOR HOT WATER RADIATORS
Filed Feb. 11, 1930
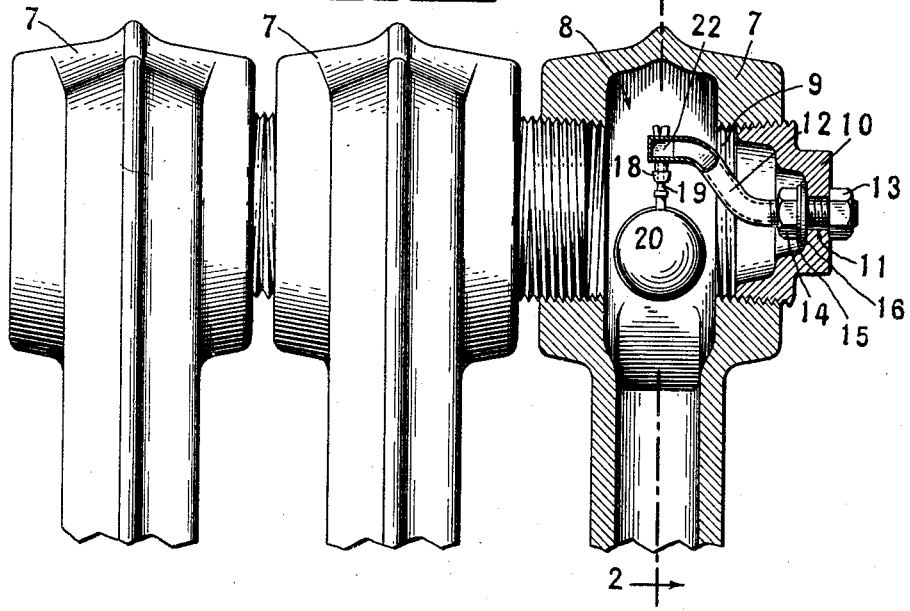
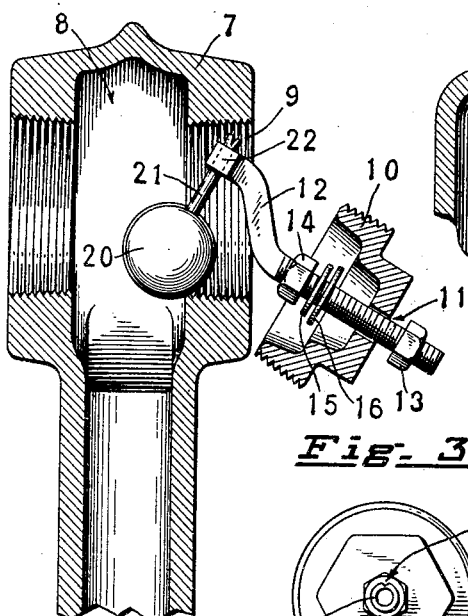
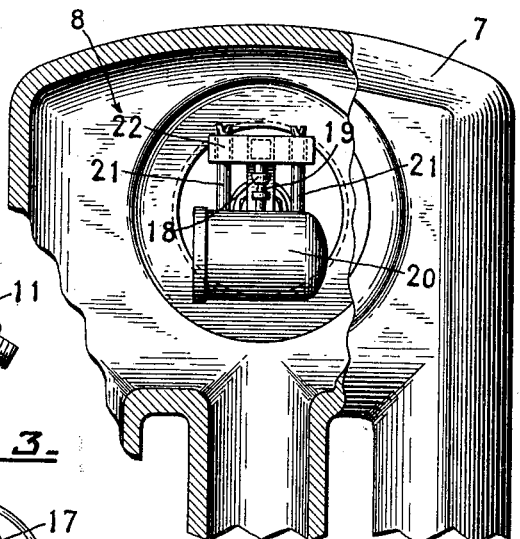
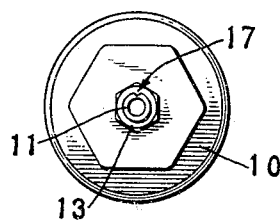
INVENTOR
*Frank Clancy,*
BY
ATTORNEY Patented Sept. 27, 1932

1,879,091

UNITED STATES PATENT OFFICE

FRANK CLANCY, OF NEW YORK, N. Y., ASSIGNOR TO SIDNEY MICHAELS, OF NEW YORK, N. Y.

AUTOMATIC AIR VALVE FOR HOT WATER RADIATORS

Application filed February 11, 1930. Serial No. 427,632.

The main object of my invention is to provide a simple reliable air relief valved vent which can be applied to standard hot water radiators so as to permit the escape of air when the water rises in the radiator and automatically closes the vent when the water reaches a predetermined level. A special object is to provide a form of construction which can be inserted into the radiator so that it is protected and concealed. Constructions of this character have been suggested in the past but on account of the very restricted space available within the commercial hot water radiators it has heretofore been found impossible to install a valve having a float large enough to function properly.

I have accordingly devised a construction in which the tube for the air outlet is adjustably supported in the conventonal type of outlet plug and has an upwardly offset inner end from which is suspended a float which controls a valve in the tube.

Fig. 1 is a view of a fragment of a hot water radiator showing the outer unit in section with my invention installed, parts being in section.

Fig. 2 is a sectional view on the plane of the line 2—2 of Fig. 1 showing the float and valve.

Fig. 3 is a view of the outer end of the plug with the float attachment.

Fig. 4 is a fragmentary sectional view showing the method of inserting the float and valve into the radiator.

The radiator unit or section 7 as illustrated is of a conventional form having a chamber 8 in its upper end and a screw threaded orifice 9 of the usual form.

The plug 10 is of the usual type adapted to fit the screw seat 9 but has a central passage 11 for the air vent tube 12.

The outer end of the tube is screw threaded and provided with one or more clamp nuts 13. An inner abutment 14 may also be in the form of a nut adjustable on the tube. A metal washer 15 and a yielding gasket or washer 16 are also preferably provided to seal the passage 11. The outer end of the tube is preferably provided with a notch or line 17 to indicate when it is in its proper position.

The inner end of the tube 12 is bent or offset upwardly and provided with an air inlet and a valve seat 18 and a valve 19 adapted to close the inlet. The valve 19 is carried by a float 20 which is supported by rods 21 loosely guided in the cross head 22.

To assemble the device the screw 13 is backed off sufficiently to allow the plug 10 to be retracted as shown in Fig. 4 whereupon the float can be inserted through the opening in the radiator section and into the chamber 8. The plug 10 is then slipped along the tube 12 and screwed into the seat 9. The abutment 14 should be located in such a position on the tube as to serve as a limiting stop for holding the inner end of the tube and the float in the proper position in the chamber 8 free from contact with the walls of the radiator section. When the plug 10 has been tightly seated the tube is then pulled outwardly until the washer 16 seats against the inner wall of the plug whereupon the nut 13 is tightened sufficiently to hold the parts in place. The notch or line 17 assists in aligning the parts so that the float 20 hangs properly. When the nut has been screwed up tight the outer end of the tube 12 may be cut off if desired. Of course a protecting cap or a drip cup (not shown) can be employed on the outer end of the tube if desired.

This construction makes it possible to employ a float of substantial size so as to provide the power necessary to properly seat the valve.

When water rises in the radiator air may escape automatically until such time as the water reaches the float and closes the valve. The valve is preferably located as far as possible above the center of the pipe connections so as to prevent the escape of water and consequent dripping.

I claim:

1. An attachment for a hot water radiator comprising a screw plug adapted to the threaded orifice in a radiator section, an air outlet tube adjustable through said plug and having an external screw threaded portion and a clamp nut on the outer end of said tube, the inner end of the tube being offset upwardly and provided with an air valve seat on a level above the outer end of the tube, a float suspended from the inner end of the tube and provided with a valve cooperating with said seat.

2. An air valve for a hot water radiator comprising a tube having a T-head on its inner end with an air vent, a float, guide rods connecting said float and said T-head, a valve carried by said float adapted to coact with said vent and a screw plug secured to the outer end of said tube and adapted to be seated in an orifice in a radiator section.

3. An attachment for a hot water radiator comprising a tube having a horizontal portion with a yielding abutment, an air outlet valve carried by the inner end of the tube, a float for actuating said valve, means for guiding the float on the inner end of said tube, a screw plug adapted to slide over the outer end of the tube while securing it in an opening in the upper part of a radiator, said tube being longer than the thickness of the plug, to permit the tube to protrude through said plug sufficiently to enable it to be held from turning while screwing the plug in place and means for clamping the tube abutment against the inner face of the plug.

4. An attachment for a hot water radiator comprising a plug adapted to be secured in an opening in the upper part of a radiator and having a horizontal passage, a valve and float carrier comprising a tube having a threaded outer end adapted to slide through said passage without rotation, a yielding abutment on said tube inside of said plug, a clamp nut on the outer end of said tube, a valve seat at the inner end of said tube, a float, a valve actuated by said float to coact with said valve seat, and guide means for said float connected to the inner end of said tube.

5. An automatic air relief valve device for hot water radiators comprising a tubular member having one end adapted to extend through a plug in the upper end of a radiator and communicating with the atmosphere at its outer end and having its inner end offset upwardly and formed with a vent in the lower side, a float positioned beneath said offset end, a valve carried by said float and adapted to close the vent upon rising and means for guiding the vertical movement of said float, said means permitting substantially free vertical movement of the float without tilting, the inner end of the tubular member, the valve, the float and the guiding means being all adapted to be inserted into the usual opening in the upper end of a radiator with a closure plug.

FRANK CLANCY.